United States Patent
Wong

(10) Patent No.: US 8,539,775 B1
(45) Date of Patent: Sep. 24, 2013

(54) GAS TURBINE ENGINES AND SYSTEMS AND METHODS FOR REMOVING PARTICULATE MATTER THEREFROM DURING OPERATION

(75) Inventor: Yates Wong, Humboldt, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/426,337

(22) Filed: Mar. 21, 2012

(51) Int. Cl.
F02C 1/00 (2006.01)

(52) U.S. Cl.
USPC .......................................... 60/772; 60/39.092

(58) Field of Classification Search
USPC ................................ 60/39.092, 782, 785, 772
See application file for complete search history.

(56) References Cited

U.S. PATENT DOCUMENTS

| | | | | |
|---|---|---|---|---|
| 2,981,062 | A * | 4/1961 | Zeiden | 60/39.091 |
| 2,992,177 | A * | 7/1961 | Morrisson | 376/391 |
| 3,478,494 | A * | 11/1969 | Van Luik, Jr. et al. | 96/61 |
| 3,769,188 | A | 10/1973 | McMahon | |
| 4,279,625 | A * | 7/1981 | Inculet et al. | 96/66 |
| 4,562,510 | A | 12/1985 | Forry et al. | |
| 4,892,139 | A | 1/1990 | LaHaye et al. | |
| 6,254,341 | B1 | 7/2001 | Ackerman et al. | |
| 6,886,345 | B2 | 5/2005 | Ritland | |
| 7,984,614 | B2 * | 7/2011 | Nolcheff | 60/751 |
| 2003/0029159 | A1 * | 2/2003 | Provitola | 60/203.1 |
| 2005/0034464 | A1 * | 2/2005 | Gonzalez | 60/801 |
| 2005/0153077 | A1 | 7/2005 | Gedeon et al. | |
| 2007/0119827 | A1 * | 5/2007 | Miller et al. | 219/121.51 |
| 2008/0277004 | A1 * | 11/2008 | Hagseth et al. | 137/803 |
| 2009/0049839 | A1 * | 2/2009 | Battles | 60/734 |
| 2010/0089027 | A1 * | 4/2010 | Muldoon | 60/202 |
| 2010/0313639 | A1 * | 12/2010 | Khibnik et al. | 73/112.01 |

FOREIGN PATENT DOCUMENTS

| | | |
|---|---|---|
| CN | 1952378 A | 4/2007 |
| DE | 4103438 A1 | 9/1991 |
| FR | 2584885 A1 | 1/1987 |
| GB | 2110569 A | 6/1983 |
| SU | 1816047 A1 | 9/1995 |

* cited by examiner

*Primary Examiner* — Phutthiwat Wongwian
(74) *Attorney, Agent, or Firm* — Ingrassia Fisher & Lorenz, P.C.

(57) ABSTRACT

Systems and methods are provided for removing particulate matter from gas turbine engines during operation are provided. Gas turbine engines are also provided. The particulate matter is suspended in a primary gas flow stream passing through an engine flowpath. A flowpath surface of the engine flowpath is electrostatically charged to a first polarity to thereby impart an electrostatic charge of the first polarity to the particulate matter. A bleed discharge duct is electrostatically charged to a second polarity and intersects the engine flowpath to define a bleed air flowpath. The second polarity is opposite to the first polarity. A bleed port is in fluid communication with the bleed discharge duct and has an outlet exterior of the gas turbine engine.

20 Claims, 3 Drawing Sheets

GAS TURBINE ENGINES AND SYSTEMS AND METHODS FOR REMOVING PARTICULATE MATTER THEREFROM DURING OPERATION

STATEMENT REGARDING FEDERALLY SPONSORED RESEARCH OR DEVELOPMENT

This invention was made with Government support under W911W6-08-2-0001 awarded by the U.S. Army. The Government has certain rights in the invention.

TECHNICAL FIELD

The present invention generally relates to gas turbine engines, and more particularly relates to gas turbine engines and systems and methods for removing particulate matter therefrom during operation.

BACKGROUND

Gas turbine engines may be used in aircraft, power plants, tanks, etc. to power various components thereof. A typical gas turbine engine includes, for example, an intake section, a compressor section, a combustor section, and a turbine section, and each section may include one or more engine components mounted to a common shaft. The gas turbine engine may also include an exhaust section that is located downstream from the turbine section.

Generally, the intake section induces air from the surrounding environment into the engine and accelerates the air toward the compressor section. The compressor section, which may include one or more compressors, raises the pressure of the air it receives from the intake section to a relatively high level. The compressed air then enters the combustor section, where a ring of fuel nozzles injects a steady stream of fuel into a combustion chamber. The injected fuel is ignited to produce high-energy compressed air. The air then flows into and through the turbine section to impinge upon turbine blades therein to rotate the shaft. The shaft may be coupled to a propeller or other component, and may provide energy for propulsion thereof. The air exiting the turbine section may be exhausted from the engine via the exhaust section. The air passes through an engine flowpath of the gas turbine engine.

Under certain operating conditions, the air passing through the gas turbine engine along the engine flowpath may include dirt, dust, sand, and other solid particles (hereinafter "particulate matter") suspended therein (the air including the particulate matter is hereinafter referred to as a "primary gas flow stream"). At least a portion of the particulate matter may fall on the inside engine component surfaces and settle thereon, with no exit path, thereby trapping the particulate matter inside the gas turbine engine. Particulate matter that collects inside the gas turbine engine may cause diminished performance and accelerated wear on the engine components. For example, particulate matter may cause erosion in the compressors. The particulate matter may get heated in the combustor section, which may cause clogging or plugging of critical orifices and/or glassing of combustor surfaces. As there are spaces in the gas turbine engine that can be narrow, any particulate matter build up may restrict airflow, including cooling airflow. In addition, as operating hours accumulate on gas turbine engines, particulate matter buildup may worsen until a mandatory engine teardown is required. Gas turbine engines operating in dirty, dusty, or sandy areas are especially prone to particulate matter buildup.

Some gas turbine engines have external and/or internal inertial particle separators or fixed barrier particle filtration systems that reduce the amount of larger particulate matter entering or being trapped inside the engine. However, these systems do not entirely prevent particulate matter from entering the engine. In addition, such systems may be heavy, detrimentally affect engine performance, require increased maintenance, and are unable to operate in certain conditions. Furthermore, filters in fixed barrier particle filtration systems are themselves susceptible to plugging with particulate matter.

Accordingly, it is desirable to provide gas turbine engines and systems and methods for removing particulate matter therefrom during operation. It is also desirable to remove particulate matter from inside the engine, without additional weight, without detrimentally affecting engine performance, without increased maintenance, and with the ability to operate in most conditions. Furthermore, other desirable features and characteristics of the present invention will become apparent from the subsequent detailed description of the invention and the appended claims, taken in conjunction with the accompanying drawings and this background of the invention.

BRIEF SUMMARY

Systems are provided for removing particulate matter from an operating gas turbine engine in accordance with exemplary embodiments of the present invention. The particulate matter is suspended in a primary gas flow stream passing through an engine flowpath. The system comprises a flowpath surface of the engine flowpath. The flowpath surface is electrostatically charged to a first polarity to thereby impart an electrostatic charge of the first polarity to the particulate matter. A bleed discharge duct is electrostatically charged to a second polarity and intersects the engine flowpath to define a bleed air flowpath. The second polarity is opposite the first polarity. A bleed port is in flow communication with the bleed discharge duct and has an outlet exterior of the gas turbine engine.

Methods are provided for removing particulate matter from an operating gas turbine engine. A primary gas flow stream with particulate matter suspended therein is passed through an engine flowpath of the operating gas turbine engine. In accordance with exemplary embodiments, the method comprises maintaining an electrostatic charge of a first polarity on a flowpath surface of the engine flowpath. An electrostatic charge of the first polarity is maintained on the particulate matter. An electrostatic charge of a second polarity is maintained on a bleed discharge duct intersecting the engine flowpath at a bleed location, the bleed discharge duct defining a bleed air flowpath and in flow communication with an associated bleed port having an outlet exterior of the operating gas turbine engine.

Gas turbine engines are provided in accordance with yet another exemplary embodiment of the present invention. The gas turbine engine comprises an inside engine component having a plurality of surfaces including a flowpath surface defining at least a portion of an engine flowpath. At least the flowpath surface is adapted to be electrostatically charged to a first polarity and to be exposed during operation of the gas turbine engine to a primary gas flow stream with particulate matter suspended therein. A bleed discharge duct intersects the engine flowpath to define a bleed air flowpath. The bleed discharge duct is adapted to be electrostatically charged to a second polarity. The second polarity is opposite to the first polarity. An associated bleed port is in flow communication with the bleed discharge duct and has an outlet exterior of the gas turbine engine.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to gas turbine engines and systems and methods for removing particulate matter therefrom during operation. As noted above, dust, dirt, and other solid particles (hereinafter "particulate matter") suspended in incoming airflow (hereinafter collectively "a primary gas flow stream") may settle on inside engine component structures/surfaces as the primary gas flow stream passes through an engine flowpath of the operating gas turbine engine and may get trapped in the gas turbine engine. With a constant electrostatic charge of a first polarity applied to the particulate matter and the same charge applied to the inside engine component structures and surfaces to be protected against the trapped and settled particulate matter, the electrostatically charged particulate matter is encouraged to stay suspended in the primary gas flow stream passing through the operating gas turbine engine, and discouraged to settle along the electrostatically charged engine surfaces that may end up causing buildup. The electrostatically charged particulate matter is encouraged to stay suspended and discouraged from settling by relying on the same electrostatic charge on the inside engine surfaces to repel the suspended electrostatically charged particulate matter. With an opposite secondary electrostatic charge applied to electrically isolated bleed discharge ducts along the engine flowpath, the suspended electrostatically charged particulate matter is attracted to the electrically isolated bleed discharge ducts that are electrostatically charged to the second polarity to remove the particulate matter attracted by the opposite electrostatic ion charge. As used herein, an "electrostatic charge" is the electric charge at rest on the surface of an insulated body (which establishes an adjacent electrostatic field).

Figure 1:
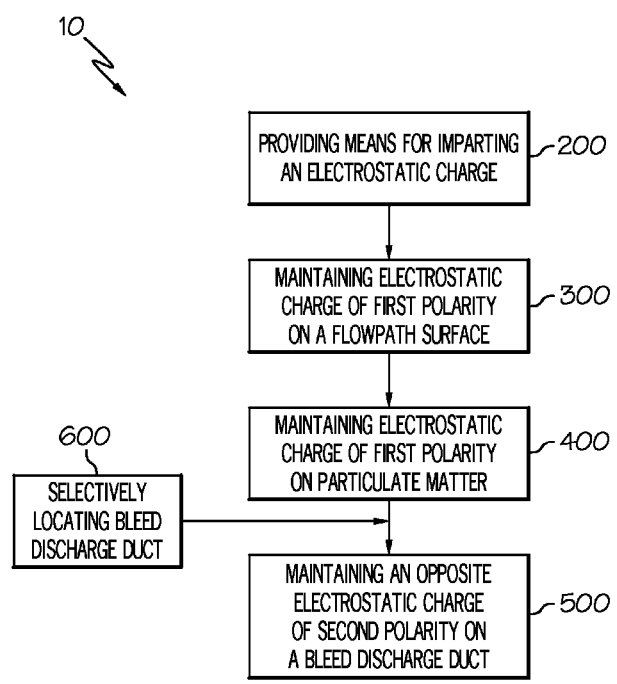
FIG. 1 is a flow diagram of methods for removing particulate matter from gas turbine engines during operation, according to exemplary embodiments of the present invention.
Figure 2:
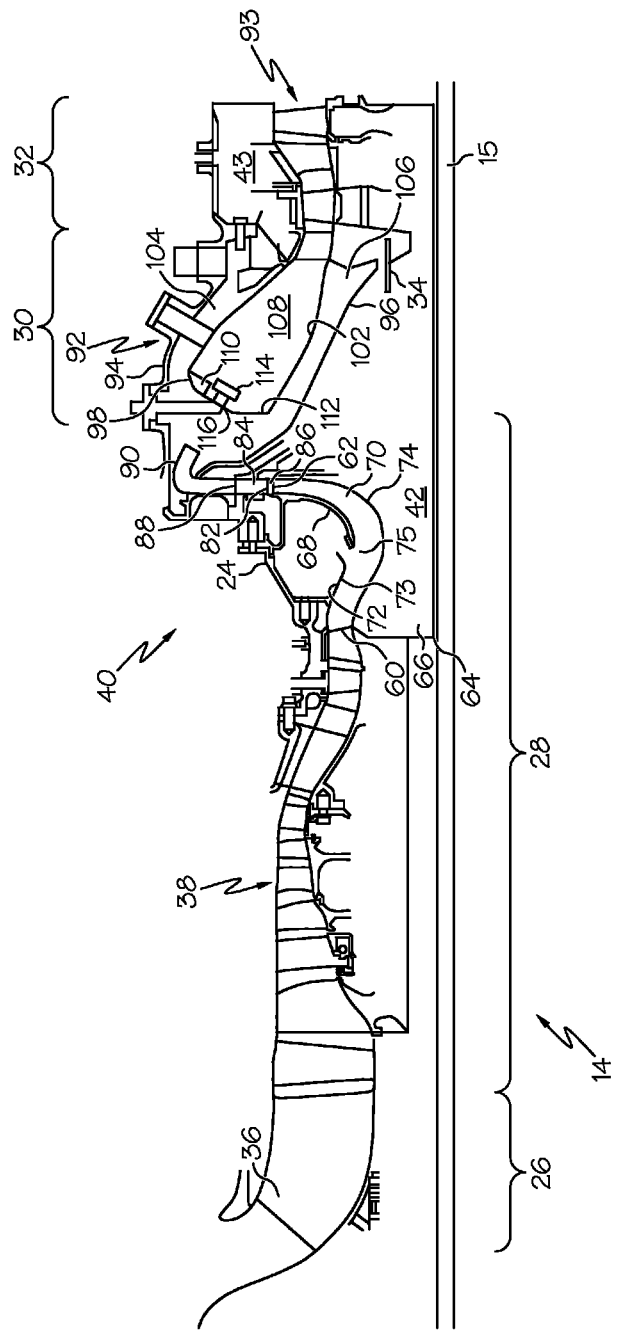
FIG. 2 is a partial cross-sectional view of an exemplary gas turbine engine.
Figure 3:
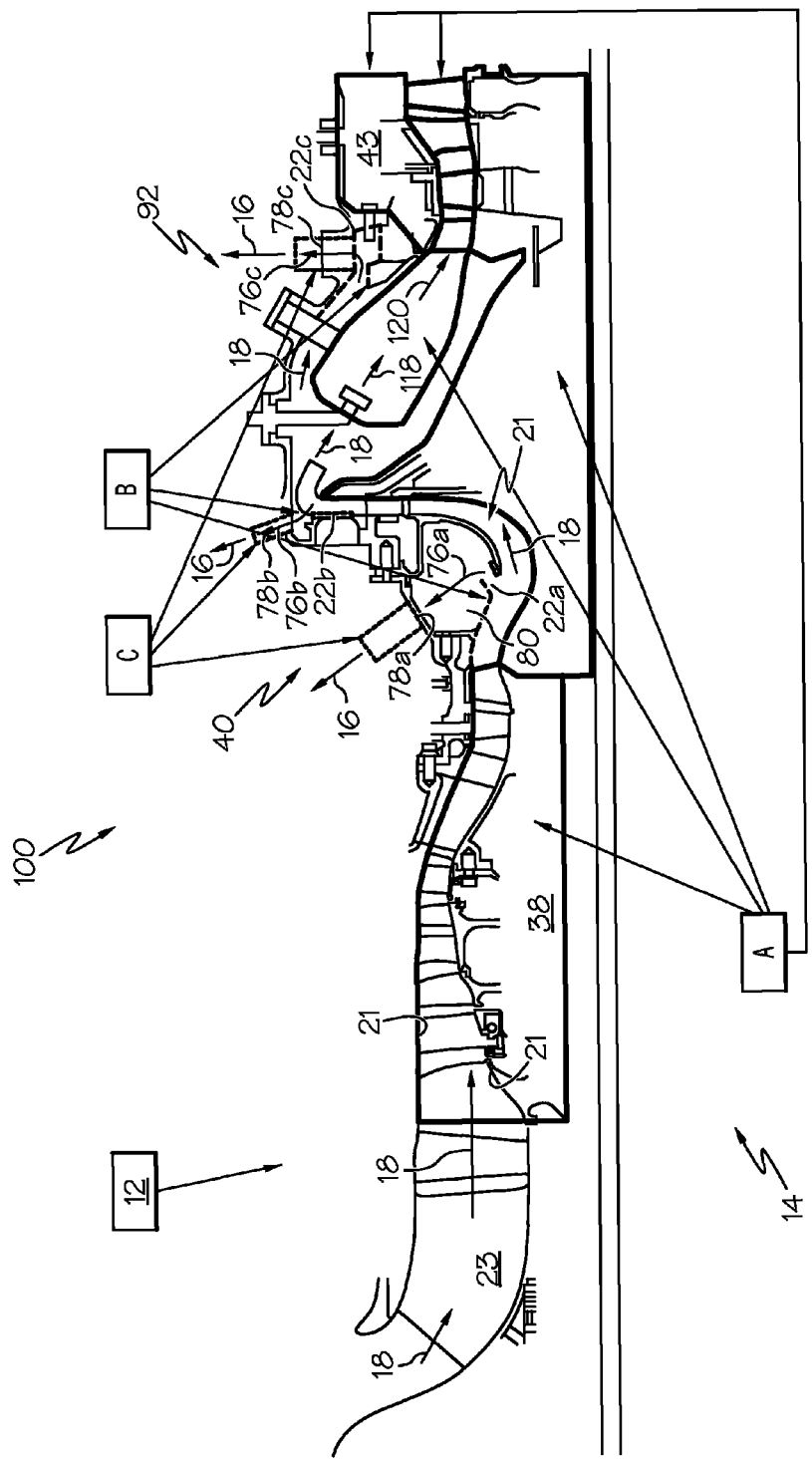
FIG. 3 is a partial cross-sectional view of the exemplary gas turbine engine of FIG. 2 during operation, illustrating a system for removing particulate matter therefrom according to exemplary embodiments of the present invention.

Referring to FIGS. 1 through 3, in accordance with exemplary embodiments, a method 10 (FIG. 1) and system 100 (FIG. 3) for removing particulate matter from an operating gas turbine engine (as exemplified by gas turbine engine 14 in FIGS. 2 and 3) are respectively illustrated. FIGS. 2 and 3 include a partial, cross-sectional view of an exemplary gas turbine engine 14 in accordance with exemplary embodiments with the remaining portion of the gas turbine engine being axis-symmetric about a longitudinal axis. FIG. 3 specifically illustrates the exemplary gas turbine engine of FIG. 2 during operation in the system 100 for removing particulate matter therefrom. While a particular gas turbine engine configuration will be described, it is to be understood that the gas turbine engine according to exemplary embodiments may have other configurations.

Still referring to FIGS. 1 through 3, the method 10 for removing particulate matter from the operating gas turbine engine begins by providing means for imparting an electrostatic charge (hereinafter "electrostatic charging means" 12) (step 200) (FIGS. 1 and 3). Any electrostatic charging means known in the art may be employed in the method and system for removing particulate matter 16 from the operating gas turbine engine (FIG. 3) described herein. For example, the electrostatic charging means 12 may include any electrical power source providing a voltage of about 70 kV to about 130 kV, although higher and lower voltages may be used. Other exemplary electrostatic charging means that may be used are known to one skilled in the art. Electrically conductive devices such as slip rings, brushes, contact seals, or the like may be used to transfer electricity between rotating and stationary engine components of the gas turbine engine. While the electrostatic charging means is illustrated in FIG. 3 as external of the gas turbine engine 14 for ease of illustration, it is to be understood that the electrostatic charging means may be internal of the gas turbine engine. As hereinafter described, and illustrated in FIG. 3, the electrostatic charge may be imparted to maintain an electrostatic charge of a first polarity on a flowpath surface 21 of an engine flowpath 23, to maintain an electrostatic charge of the first polarity on particulate matter 16 suspended in a primary gas flow stream 18 that passes through the engine flowpath 23 during operation of the gas turbine engine, or on a combination thereof. The electrostatic charging means is used to impart an electrostatic charge of a second polarity on an electrically isolated bleed discharge duct that intersects the engine flowpath as hereinafter described. The primary gas flow stream 18 that passes through the engine flowpath comprises air and the particulate matter 16.

Referring now specifically to FIGS. 2 and 3 (some of the reference numbers have been omitted in one of FIG. 2 or FIG. 3 for ease of illustration), the gas turbine engine is disposed in an engine case 24 and, as noted above, includes an intake section (e.g., a fan module) 26, a compressor section 28, a combustor section 30, and a turbine section 32. The turbine section may include a tangential onboard injector ("TOBI") assembly 34 (shown schematically) for purposes as hereinafter described. The gas turbine engine 14 may include additional sections (not shown), such as an exhaust section downstream of the turbine section. Each of the gas turbine engine sections in the gas turbine engine may include one or more inside engine components located along the engine flowpath 23 (FIG. 3), as hereinafter described. Such inside engine components may include a low pressure compressor 38, a high pressure compressor 40, a combustor assembly 92, a turbine assembly 93, or a combination thereof. Each inside engine component has a plurality of surfaces. At least one surface of the plurality of surfaces comprises the flowpath surface 21. As used herein, the term "flowpath surface" means the surface or surfaces of the engine flowpath that is directly exposed to the primary gas flow stream 18 as it passes therethrough during operation of the gas turbine engine, as hereinafter described and illustrated in FIG. 3. Flowpath surfaces may be spaced apart to define the engine flowpath. As noted above, the intake section 26 induces air from the surrounding environment (including particulate matter) (i.e., the primary gas flow stream 18) into an airflow inlet 36 in the intake section 26 and accelerates the air into the compressor section 28 of the gas turbine engine.

The compressor section 28 includes such inside engine components as the low pressure compressor 38 and the high pressure compressor 40. However, in other embodiments, the number of compressors in the compressor section may vary. The high pressure compressor 40 (hereinafter referred to as a "centrifugal compressor") includes an impeller 42 that includes a plurality of blades (not shown). Impeller 42 extends afterward from a compressor inlet 60 and downstream encompassing the blades and includes an exit 62, a hub 64, and a rotating impeller body 66 extending therebetween. Impeller 42 is bounded by a non-rotating shroud 68 defining its radially outer surface. Impeller hub 64 extends circumferentially about a rotor shaft (not shown). Impeller body 66 and shroud 68 extend radially outward from the compressor inlet 60 to the exit 62 in a frusto-conical shape. A chamber 70 is defined between impeller body 66 and shroud 68. Chamber 70 includes a radially outer flow surface 72 that extends along a portion of shroud 68 and a radially inner flow surface 74, for example an arcuate flow surface that extends along a portion of impeller body. The radially inner flow surface 74 creates a compressor section flowpath through the impeller. The compressor section flowpath comprises a portion of the engine flowpath 23. The radially outer flow surface 72 and the radially inner flow surface 74 are flowpath surfaces of the engine flowpath. As noted above, a "flowpath surface" is any surface inside the engine that is directly exposed to the primary gas flow stream 18 passing through the engine flowpath, and may include, for example, rotating compressor blades, an engine strut, an engine shroud, or a combination thereof.

For purposes as hereinafter described, in accordance with exemplary embodiments, a bleed discharge duct 22*a* (FIG. 3) is located along and intersects the radially outer flow surface 72 of the impeller intermediate the impeller inlet 60 and the impeller exit 62. Thus, bleed discharge duct 22*a* intersects the engine flowpath 23 between the impeller inlet and impeller exit of the high pressure compressor 40. Bleed discharge duct 22*a* defines a bleed air flowpath 76*a* into a bleed plenum 80 and through an associated bleed port 78*a* in the engine case 24. A first upstream portion 73 of the radially outer flowpath surface 72 and a second downstream portion 75 of the radially outer flowpath surface combine to form the bleed discharge duct 22*a*. The bleed port 78*a* is in flow communication with the bleed discharge duct 22*a* and has an outlet exterior of the engine case 24 to eject particulate matter therefrom. The bleed plenum 80 is in flow communication between the bleed discharge duct 22*a* and the associated bleed port 78*a*. The bleed plenum 80 is formed by the radially outer flowpath surface on its radially inner side and by the engine case 24 on its radially outer side.

Referring again to the high pressure compressor 40 illustrated in FIGS. 2 and 3, a discharge opening 82 is adjacent impeller exit 62 and permits impeller chamber 70 to be in flow communication with a diffuser 84. The high pressure air in the primary gas flow stream from the high pressure compressor may be directed into the combustor section 30 by the diffuser 84. The diffuser may diffuse the high pressure air for more uniform distribution into the combustor section. The diffuser 84 is positioned radially outward from the centrifugal compressor 40 and includes a diffuser inlet 86 and a diffuser outlet 88. Diffuser inlet 86 is adjacent impeller discharge opening 82 and inlets air into diffuser 84. A deswirl cascade 90 is in flow communication with diffuser and extends from diffuser outlet 88.

In an embodiment, as hereinafter described and identified in FIG. 3, a bleed discharge duct 22*b* is selectively located immediately upstream from deswirl cascade 90, at the discharge of the high pressure compressor 40 for purposes as hereinafter described. The bleed discharge duct 22*b* intersects the engine flowpath 23 at the discharge of the high pressure compressor 40 and is in flow communication with a bleed port 78*b* in the engine case. The bleed port 78*b* is located downstream and proximate the bleed discharge duct 22*b*. As with bleed port 78*a*, bleed port 78*b* has an outlet exterior of the gas turbine engine for ejecting particulate matter 16 therefrom, as hereinafter described. Bleed discharge duct 22*b* defines a bleed air flowpath 76*b* through the associated bleed port 78*b* in the engine case 24.

Still referring to FIGS. 2 and 3, the combustor section 30 including a combustor assembly 92 is positioned downstream from the centrifugal compressor. The combustor assembly 92 includes an outer casing 94 and an inner casing 96. The outer and inner casings circumscribe the axially extending engine centerline 15 to define an annular pressure vessel. Within the annular pressure vessel, an outer liner 98 and inner liner 102 are respectively radially spaced apart from the outer casing and the inner casing to form outer and inner air plenums 104 and 106. The outer and inner liners are radially spaced apart to define a combustion chamber 108. The combustor assembly further includes a front end assembly 110 at a forwardmost end of the combustion chamber. The front end assembly comprises an annularly extending combustor shroud 112, and fuel injectors 114. One fuel injector is shown in the cross-sectional view of FIG. 2. It should be understood that the combustor assembly may include a greater number of fuel injectors. The annularly extending combustor shroud extends between and is secured to the forwardmost ends of the outer and inner liners 98 and 102. The combustor shroud 112 includes a plurality of circumferentially distributed shroud ports 116 that accommodate the fuel injectors and introduce air into the forward end of the combustion chamber. Each fuel injector is secured to the outer casing 94 and projects through one of the shroud ports 116. Each fuel injector introduces a swirling, intimately blended fuel-air mixture 118 that supports combustion in the combustion chamber. The combusted air 120 is then directed into the turbine section 32.

In an embodiment, as identified in FIG. 3, bleed discharge duct 22*c* is located in the combustor section 30 to extract a portion of the air passing through the engine flowpath 23 in the combustor assembly 92, as hereinafter described. Bleed discharge duct 22*c* is formed between a first upstream portion and a second downstream portion of the combustor outer casing and defines a bleed air flowpath 76*c* in fluid communication with an associated bleed port 78*c* having an outlet exterior of the engine case 24. The bleed discharge duct 22*c* is in flow communication with the bleed port 78*c*. The first upstream portion and a second downstream portion of the combustor outer casing define a flowpath surface of the engine flowpath 23 through the outer air plenum of the combustor assembly. The combustor section flowpath comprises a portion of the engine flowpath 23.

The turbine section 32 may include the turbine assembly 93 including an intermediate turbine and a power turbine disposed in axial flow series (inside engine components). The combusted air 120 (i.e., the primary gas flow stream) from the combustor section 30 expands through the turbines causing each to rotate. As each turbine rotates, each drives equipment in the engine via concentrically disposed shafts or spools. For example, the intermediate turbine may drive the compressor via an intermediate shaft, which is coupled to the compressor shaft. The power turbine includes a turbine rotor that drives a primary output component, such as a propeller. In such case, the turbine rotor may be adapted to rotate about the longitudinal axis (e.g., the engine centerline) 15 and may include a hub that is coupled to a turbine rotor shaft. The hub may also include a plurality of turbine blades extending radially outwardly. The turbine blades may be surrounded by a portion of the engine case 24 to define a turbine section flowpath through which the longitudinal axis extends. The turbine section flowpath comprises a portion of the engine flowpath 23. After the primary gas flow stream passes through the turbine section, it is then exhausted through the exhaust section (not shown).

Under certain operating conditions, as known in the art, a fraction of the air in the primary gas flow stream 18 passing through the gas turbine engine 14 as described above may be extracted from the engine flowpath 23 through the one or more bleed discharge ducts that intersect the engine flowpath. The extracted fraction of air is hereinafter referred to as "bleed air". For example, a fraction of the air may be bled from the compressor section 28, through for example bleed discharge duct 22a, bypassing the combustor section 30, and used to cool, among other components, the blades in the turbine section 32 (not shown). The fraction of the compressed air that is used to cool the turbine blades in the turbine section is hereinafter referred to as "cooling air". Cooling air is bleed air. The TOBI assembly 34 in the turbine section is configured to direct the cooling air from the compressor section toward the turbine section for cooling of the turbine blades therein. More specifically, the cooling air flows into an entrance of the stationary Tangential On Board Injector (TOBI) assembly 34 and is directed through secondary flow pathways (not shown) to the turbine blades. In conventional gas turbine engines, the TOBI assembly and the secondary flow pathways may become clogged by particulate matter in the cooling air, the particulate matter in the cooling air originating from the primary gas flow stream passing through the gas turbine engine.

Referring again to FIGS. 1 and 3, method 10 for removing particulate matter from an operating gas turbine engine continues with maintaining an electrostatic charge of a first polarity (a "primary charge") on a flowpath surface 21 of the engine flowpath 23, resulting in an "electrostatically charged flowpath surface" 21 (step 300). The electrostatic charge on the flowpath surface may be maintained by electrostatically charging the flowpath surface using the electrostatic charging means, by charge transfer from the particulate matter in the primary gas flow stream as hereinafter described, or both. As the inside engine components may be metallic and grounded to each other, the inside engine components and surfaces thereof (including flowpath surfaces) that are electrically connected will also receive the same first polarity charge as the electrostatically charged flowpath surface, as illustrated in FIG. 3. The electrostatically charged surfaces are shown in bold lines in FIG. 3, and define one or more primary charged engine regions of the operating gas turbine engine, the primary charged engine regions identified in FIG. 3 with the letter "A". The primary charged engine regions may correspond to the outer surfaces of the inside engine components. The illustrated primary charged engine regions A in FIG. 3 include the low pressure compressor 38, the high pressure compressor 40, the combustor assembly 92, and a turbine shroud assembly 43.

Still referring to FIGS. 1 and 3, method 10 continues by maintaining an electrostatic charge of the first polarity (hereinafter also referred to as a "primary charge") on the particulate matter in the air (primary gas flow stream) passing through the gas turbine engine, resulting in "electrostatically charged particulate matter" (step 400). The "electrostatically charged particulate matter" may also be referred to herein as "primary charged particulate matter." The electrostatic charge on the particulate matter may be maintained by electrostatically charging the particulate matter in the air by the electrostatic charging means 12 or by direct charge transfer from the primary charged flowpath surface. For example, electrostatic charging means such as discharge electrodes create a strong electrical field that can ionize the primary gas flow stream, and this ionization can electrostatically charge the particulate matter that is in the primary gas flow stream entering the gas turbine engine through the air inlet. Alternatively, as a result of the primary charged rotating compressor rotor blades (as an electrostatically charged flowpath surface) coming into direct contact with the primary gas flow stream 18, the primary charged rotating compressor rotor blades can directly transfer the electrostatic charge of the first polarity therefrom to the incoming air including the suspended particulate matter (i.e., the primary gas flow stream). As a result of being electrostatically charged with the same first polarity as that of the flowpath surface, the flowpath surface repels the electrostatically charged particulate matter during airflow through the gas turbine engine. The polarities chosen for the particulate matter and the flowpath surface can be either negative or positive, provided the polarities are the same. The first polarity is an electrostatic charge to cause repelling of like charges, thereby substantially preventing the particulate matter electrostatically charged to the first polarity from impacting the flowpath surface of the engine, the flowpath surface also electrostatically charged to the first polarity.

Referring now to FIGS. 1 through 3, according to exemplary embodiments, method 10 continues by maintaining an electrostatic charge of a second polarity on a bleed discharge duct (exemplified by bleed discharge ducts 22a through 22c) that intersects the engine flowpath at a bleed location (step 500). The bleed discharge ducts electrostatically charged to the second polarity may hereinafter be referred to as "secondary charged bleed discharge ducts." The second polarity is opposite to the first polarity. The electrostatic charge of the second polarity may be maintained on the electrically isolated bleed discharge duct by electrostatically charging the bleed discharge duct using the electrostatic charging means 12. The secondary charged bleed discharge ducts are referred to in FIG. 3 with the letter "B". The exemplary bleed locations are identified in FIG. 3 with the letter "C". The opposite electrostatic charge creates an attraction force for the primary charged particulate matter in the primary gas flow stream passing through the operating gas turbine engine, thereby attracting the primary charged particulate matter to the secondary charged bleed discharge duct. The attraction force encourages the primary charged particulate matter 16 to exit the engine flowpath through the oppositely charged bleed discharge duct into the bleed air flowpath (as exemplified by bleed air flowpaths 76a through 76c) and ejected exteriorly of the operating gas turbine engine through the associated bleed port (as exemplified by bleed ports 78a through 78c) in the engine case 24 at a bleed location C.

As noted above, the secondary charged bleed discharge duct may be selectively located where particulate matter in the primary gas flow stream may otherwise collect, to take advantage of the greater inertia and momentum of the particulate matter relative to the air of the primary gas flow stream, or both (step 600). For example, to facilitate flow of the primary charged particulate matter into a secondary charged bleed discharge duct where it can be ejected exterior of the engine case through the associated bleed port, the primary gas flow stream passing through the gas turbine engine may be forced around one or a series of flowpath turns, changing flow direction. Most particulate matter will not be capable of changing direction at the one or the series of flowpath turns, due to the greater inertia and momentum of the particulate matter. Consequently, most of the particulate matter electrostatically charged to the first polarity will be channeled into the bleed air flowpath defined by the selectively located bleed discharge duct electrostatically charged to the second polarity and out of the gas turbine engine through the associated bleed port. For example, bleed discharge duct 22b is selectively located intermediate the diffuser outlet and the entrance to the deswirl cascade. When the primary gas flow stream (i.e., the diffused air including the particulate matter) changes direction to enter the deswirl cascade, the primary charged particulate matter 16 therein is channeled into the bleed air flowpath 76b defined by the bleed discharge duct 22b and is ejected out of the gas turbine engine through the associated bleed port 78b.

While a bleed discharge duct is described as being located at a specific location (i.e., between the impeller inlet and impeller exit of the high pressure compressor 40, at the exit or discharge of the high pressure compressor 40, and in the combustor assembly 92), it is to be understood that particulate matter may be removed at alternative or additional locations along the engine flowpath according to exemplary embodiments.

From the foregoing, it is to be appreciated that systems and methods for removing particulate matter from an operating gas turbine engine are provided. The systems and methods assist in keeping the particulate matter suspended in the primary gas flow stream, and extracted from the engine flowpath of the operating gas turbine engine through bleed discharge ducts that may be selectively located. With a constant electrostatic charge applied to the inlet air and particulate matter and the same charge applied to the engine structures to be protected against buildup of particulate matter, the incoming particulate matter is encouraged to stay suspended in the primary gas flow stream, and discouraged to settle along inside engine surfaces (including the TOBI assembly and secondary flow pathways) that end up causing buildup. With an opposite electrostatic charge applied to the one or more bleed discharge ducts, the primary charged particulate matter in the primary gas flow stream is attracted thereto and is ejected through the associated bleed port, thereby removing particulate matter from the operating gas turbine engine.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for removing particulate matter from an operating gas turbine engine, the particulate matter suspended in a primary gas flow stream passing through an engine flowpath, the system comprising:
    a flowpath surface of each portion of the engine flowpath electrostatically charged to a first polarity to thereby impart an electrostatic charge of the first polarity to the particulate matter;
    a bleed discharge duct electrostatically charged to a second polarity and intersecting the engine flowpath to define a bleed air flowpath, the second polarity opposite to the first polarity; and
    a bleed port in flow communication with the bleed discharge duct and having an outlet exterior of the gas turbine engine.

2. The system of claim 1, further comprising:
    a plurality of inside engine components located along the engine flowpath, each having a plurality of surfaces electrostatically charged to the first polarity, at least one comprising the electrostatically charged flowpath surface.

3. The system of claim 1, further comprising means for imparting the electrostatic charge.

4. The system of claim 1, wherein the particulate matter having the electrostatic charge of the same first polarity as the electrostatically charged flowpath surface comprises primary charged particulate matter, the electrostatically charged flowpath surface configured to repel the primary charged particulate matter when brought into proximity therewith and the electrostatically charged bleed discharge duct configured to attract the primary charged particulate matter.

5. The system of claim 1, wherein the electrostatically charged flowpath surface comprises a rotating compressor blade.

6. The system of claim 1, wherein the operating gas turbine engine comprises a high pressure compressor and a combustor assembly, the electrostatically charged bleed discharge duct located at a bleed location between an impeller inlet and impeller exit of the high pressure compressor, at a discharge of the high pressure compressor, in the combustor assembly, or a combination thereof.

7. The system of claim 4, wherein the electrostatically charged bleed discharge duct is selectively located where particulate matter collects, to take advantage of the greater inertia and momentum of the particulate matter relative to air in the primary gas flow stream, or both.

8. The system of claim 7, wherein the electrostatically charged bleed discharge duct is selectively located immediately upstream of a flowpath turn, the flowpath turn configured to cause the primary gas flow stream to take a change in direction to channel the primary charged particulate matter therein into the electrostatically charged bleed discharge duct.

9. A method for removing particulate matter from an operating gas turbine engine while passing a primary gas flow stream with particulate matter suspended therein through an engine flowpath of the operating gas turbine engine, the method comprising the steps of:
    maintaining an electrostatic charge of a first polarity on a flowpath surface of each portion of the engine flowpath;
    maintaining an electrostatic charge of the first polarity on the particulate matter; and
    maintaining an electrostatic charge of a second polarity on a bleed discharge duct intersecting the engine flowpath at a bleed location, the bleed discharge duct defining a bleed air flowpath and in flow communication with an associated bleed port having an outlet exterior of the operating gas turbine engine.

10. The method of claim 9, wherein the step of maintaining an electrostatic charge of a first polarity on a flowpath surface comprises maintaining the electrostatic charge of the first polarity on a plurality of inside engine surfaces, at least one inside engine surface of the plurality of inside engine surfaces comprising the flowpath surface.

11. The method of claim 10, further comprising providing electrostatic charging means for imparting an electrostatic charge.

12. The method of claim 11, wherein the step of maintaining an electrostatic charge of the first polarity on the particulate matter comprises imparting an electrostatic charge thereon by the electrostatic charging means or by direct transfer from the electrostatically charged flowpath surface.

13. The method of claim 10, wherein the step of maintaining an electrostatic charge of the first polarity on the particulate matter provides primary charged particulate matter and the step of maintaining an electrostatic charge of a second polarity on a bleed discharge duct provides a secondary charged bleed discharge duct, the method further comprising selectively locating the bleed location where particulate matter collects, to take advantage of the greater inertia and momentum of the particulate matter relative to air in the primary gas flow stream, or both.

14. The method of claim 13, wherein the step of selectively locating the bleed location comprises selectively locating the bleed location immediately upstream of a flowpath turn, the flowpath turn configured to cause the primary gas flow stream to take a change in direction to channel the primary charged particulate matter therein into the secondary charged bleed discharge duct.

15. A gas turbine engine comprising:
an inside engine component having a plurality of surfaces including a flowpath surface defining at least a portion of an engine flowpath, at least the flowpath surface and the engine flowpath configured to be electrostatically charged to a first polarity and to be exposed during operation of the gas turbine engine to a primary gas flow stream with particulate matter suspended therein;
a bleed discharge duct intersecting the engine flowpath to define a bleed air flowpath, the bleed discharge duct configured to be electrostatically charged to a second polarity, the second polarity opposite the first polarity; and
a bleed port in flow communication with the bleed discharge duct, the bleed port having an outlet exterior of the gas turbine engine.

16. The gas turbine engine of claim 15, wherein the electrostatically charged flowpath surface is configured to directly transfer the electrostatic charge of the first polarity to the particulate matter to provide primary charged particulate matter in the primary gas flow stream.

17. The gas turbine engine of claim 16, wherein the electrostatically charged flowpath surface repels the primary charged particulate matter in the primary gas flow stream and the electrostatically charged bleed discharge duct is configured to attract the primary charged particulate matter.

18. The gas turbine engine of claim 17, wherein the inside engine component comprises a low pressure compressor, a high pressure compressor, a combustor assembly, a turbine assembly, or a combination thereof and the bleed discharge duct is located between an inlet and a discharge of the high pressure compressor, at the discharge of the high pressure compressor, in the combustor assembly, or a combination thereof.

19. The gas turbine engine of claim 18, wherein the bleed discharge duct is selectively located where particulate matter collects, to take advantage of the greater inertia and momentum of the particulate matter relative to air in the primary gas flow stream, or both.

20. The method of claim 19, wherein the bleed discharge duct is selectively located immediately upstream of a flowpath turn, the flowpath turn configured to cause the primary gas flow stream to take a change in direction to channel the primary charged particulate matter therein into the electrostatically charged bleed discharge duct.

* * * * *